United States Patent Office 3,301,794
Patented Jan. 31, 1967

3,301,794
PROCESS FOR MANUFACTURING IMPROVED
CATALYTIC PARTICLES
Robert H. Cramer, Belmont, Mass., and Abbott F. Houser, Cherry Hill Township, Camden County, and Kenneth I. Jagel, Jr., Mantua Township, Gloucester County, N.J., assignors to Mobil Oil Corporation, a corporation of New York
No Drawing. Filed Jan. 23, 1963, Ser. No. 253,264
7 Claims. (Cl. 252—448)

The present invention relates to a process for manufacturing improved catalytic particles. More particularly, the present invention is directed to an improvement in the process of the manufacture of highly active catalytic particles comprising a mixture of aluminosilicates and inorganic oxide gels utilizing the procedure of producing a gel from the approprate sol in a water-immiscible fluid medium, and utilizing the improvement of passing over said gel an aqueous inorganic ammonium-containing solution at a rate to provide a turbulent flow of said solution for a period of time to remove the water-immiscible traces from said gel. The treated gel is further processed by base exchanging, water washing, drying and calcining. The catalytic particles which are produced by this process not only have the exceptional physical properties of good hardness and resistance to breakage by shock but have improved catalytic activity, especially for hydrocarbon conversions.

The preparation of inorganic oxide particles by introducing an inorganic sol into a column of water-immiscible liquid wherein it breaks into globules, sets to a gel and with additional processing, provides a catalytic cracking catalyst as is known in the art and described in U.S. 2,384,946. The preparation of the cataytic materials by these known methods provides inorganic oxide gels characterized by smooth hard surfaces and high resistance to attrition loss. In the preparation of these known catalysts, the water-immiscible liquid in which the gel is set, adheres to the gel composte. This water-immiscible liquid, such as hydrocarbon oils, is washed from the surface by using an organic solvent, such as benzene, petroleum naphtha, and the like and the organic solvent can be readily released by heating. The catalyst composite is further soaked with an aluminum solution, such as aluminum nitrate, aluminum sulfate and the like to replace the zeolitic sodium in the inorganic gel with aluminum ions. Although satisfactory cracking catalysts can be obtained utilizing this process, improvements in the process and preparation of improved catalyst composites are continually being sought by those skilled in the art.

A significant improvement in the process to prepare catalytic particles comprising a mixture of aluminosilicates having uniform pore openings between 6 and 15 angstrom units and an inorganic oxide gel has been discovered. The catalyst composite is prepared by introducing an inorganic oxide sol containing finely divided aluminosilicate into a column of a water-immiscible fluid medium wherein said sol breaks into globules and sets to a gel. It is at this point that the improvement of the process of this invention is utilized in passing over the gel particles an aqueous inorganic ammonium-containing solution at a rate to provide a turbulent flow of said solution for a period of time to remove the water-immiscible fluid traces from said gel. The gel is further processed by base exchanging the available sodium ion with other ions, water washing and calcining to obtain a finished and improved cracking catalyst.

The preparation of cracking catalysts comprising aluminosilicates and inorganic oxide gels is considerably different from the known inorganic oxide gel cracking catalysts, such as silica-alumina. It is well known that aluminosilicates are unusual in their ability to adsorb inorganic materials and the manner of maintaining the adsorbed materials, even under high temperature conditions. In any type of cracking catalyst, it is highly desirable to reduce the amount of sodium content in order to improve the cracking activity of the catalyst and to avoid the sintering effect which sodium produces at high temperatures in cracking catalysts. In utilizing aluminosilicates in combination with inorganic oxide gels, cracking catalysts which are superior in activity and conversion properties to the known cracking catalyst are provided. It is essential, however, that the aluminosilicate-inorganic oxide gel catalyst have a substantially reduced sodium content in most cases to provide a catalyst which produces superior results in hydrocarbon conversion processes. In the preparation of particles of aluminosilicate-inorganic oxide gels by gelation in a water-immiscible fluid medium in a manner as described above, the fluid mediums used are organic compounds, such as kerosene, lubricating oils, and the like. There organic compounds will adhere to the gel prepared and will be adsorbed into the aluminosilicate itself. In order to base exchange the catalyst efficiently to reduce the sodium content, an organic solvent will not suffice since the aluminosilicate can and will adsorb the solvent itself. The presence of the organic material in the aluminosilicate will prevent the base exchange of the sodium ions, not only in the aluminosilicate, but possibly in the inorganic oxide gel.

It has been discovered that when aluminosilicate-inorganic oxide gels are prepared in the water-immiscible fluid mediums, a treatment of prepared gel is used which comprises the flow of an aqueous inorganic ammonium-containing solution over the gel at a rate to provide a turbulent flow will effectively remove the water-immiscible fluid traces from the gel. Under these conditions, an effective base exchange of the available sodium in the gel will be provided and, with further processing, the final aluminosilicate-inorganic oxide gel catalyst composite not only will have exceptional physical properties of good hardness and resistance to breakage by shock but have improved catalytic activity, especially for hydrocarbon conversions.

The process of forming the aluminosilicate inorganic oxide gel catalytic particles involves continuously contacting within an enclosed mixing chamber such as an injector or nozzle mixer, streams of reactant solutions of such concentrations and proportions that no gelation occurs within the mixer, but only at some predetermined time after leaving the mixer and under such conditions of flow that each stream is completely and uniformly dispersed within and throughout the other at the instant of contact. The resultant colloidal solution is ejected from the mixer through an orifice or orifices of suitable size so as to form globules of the colloidal solution set to a gel before they pass out of that medium. The fluid medium may be any liquid or combination of liquids which is immiscible with water, preferably organic mediums such as petroleum naphtha, kerosene, light lubricating oils, and the like. It is essential to the formation of a structurally strong particle that the sol not be mechanically disturbed during the time of setting. Evaporation of water in the sol tends to generate steam which not only mechanically disturbs the gel structure during formation but also introduces gas bubbles of large size compared with the size of the particle. The fluid medium should, therefore, be maintained below its boiling point or below the boiling point of the sol until the same has set to a firm hydrogel.

The aluminosilicates employed in the process of the instant invention are frequently referred to as synthetic zeolites. These materials are essentially the dehydrated forms of crystalline hydrous siliceous zeolites containing varying quantities of metals such as alkali, alkaline earth, rare earth, and the like and aluminum with or without other metals. The metal atoms, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities are precisely uniform in size. The metal aluminosilicates used in the process of this invention have a uniform pore structure comprising openings characterized by effective pore diameter of between 6 and 15 Angstrom units.

Typical aluminosilicates which can be used to prepare the catalyst of this process include the alkali metal alumino-silicate, prepared following the general procedure described in U.S. 2,882,244, Belgian 577,642, Belgian 598,-582, and the like. Other metal aluminosilicates can be prepared by base exchanging the crystalline alkali metal aluminosilicate with a solution essentially characterized by a pH in excess of 4.5, preferably by a pH in the range from 5 to 10 and containing an ion capable of replacing alkali metal. The base-exchange operation is carried out at a sufficient period of time and under appropriate temperature conditions to substantially reduce the alkali metal content of the aluminosilicate and preferably to replace at least about 90 percent of the alkali metal originally contained in the aluminosilicate. It is contemplated that any ionizable compound for a metal capable of replacing the alkali metal may be employed for base exchange alone or in combination with other ions. Compounds can be used wherein the replacing ion is in the cationic state. Inorganic salts will usually be employed. Suitable materials include soluble compounds of calcium, magnesium, manganese, vanadium, chromium, cerium, aluminum, lanthanum, praseodymium, neodymium, samarium, yttrium, and other rare earths and mixtures of the same with other ions, such as ammonium. Organic salts of the foregoing metals, such as acetate and formate may also be used as well as very dilute or weak acids.

In order to facilitate the base-exchange operation of the aluminosilicate, aqueous slurries of alkali metal aluminosilicate are utilized as the starting materials. For economic reasons, it is desired to use the highest concentrations of aluminosilicates in water. A water slurry of highly concentrated aluminosilicate not only has a high viscosity which seriously hampers the pumping of this slurry but also has a high ratio of particle agglomeration which inhibits the efficient base exchange of the aluminosilicate. Under these conditions, the addition of various dispersants such as tannic acid, lecithin, ethylene oxide-alkyl phenol polymers or a water soluble salt of lignin sulfonic acid to the concentrated aqueous slurries of aluminosilicates not only reduces the viscosity of the slurry but also inhibits particle agglomeration so that efficient base exchange can occur. The difficulty, however, arises on the use of the dispersant-containing aluminosilicate since the dispersant will act as a wetting agent and the aluminosilicate and the gel in which it is contained will adhere large quantities of the water-immiscible fluid medium wherein the gel is set. Utilizing the improvement of this invention will permit the use of dispersants in the aqueous aluminosilicates for the efficient base-exchange operation and will remove the undesirable traces of the water-immiscible fluid from the composite gel product.

The finely divided aluminosilicates which are admixed with the inorganic oxide sol should have a weight mean particle diameter of less than about 10 microns, preferably between 2 and 7 microns and more preferably between 3 and 5 microns. The use of finely divided materials having a weight mean particle diameter in excess of 10 microns gives rise to a physically weak product while the use of fines having a weight mean particle diameter of less than 1 micron produced a product of low diffusivity.

Intimate admixture of the ingredients of the catalyst can be conducted by dispersing the finely divided aluminosilicate in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means, where the reactants are brought into intimate contact.

The inorganic oxide sol employed serves in its gel form as a matrix for the crystalline aluminosilicate powder distributed therein. While the sol used to prepare the silica gel may be utilized as a suitable matrix, it is preferred that the siliceous hydrosol employed be a sol which on gelation will provide a cogel of silica and an oxide of at least one metal selected from the group consisting of metals of Groups II–A, III–B and IV–A of the Periodic Table. Such components include, for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia- and silica-magnesia-zirconia. Particularly preference is accorded cogels of silica-alumina, silica-zirconia and silica-alumina-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the metal oxide content ranging from zero to 45 weight percent. Siliceous hydrogels utilized herein and hydrogels obtained therefrom may be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and inorganic oxide gel matrix may vary widely with the crystalline aluminosilicate content ranging from about 5 to about 90 percent by weight and more usually, particularly where the composite is prepared in the form of beads, in the range of about 10 to about 50 percent by weight of the composite.

If desired, additional fines may be added to the aluminosilicate-inorganic oxide sol to improve physical properties of the finished catalyst which includes improved attrition resistance of the catalyst composite. Suitable fines which can be added are those materials which are inert for hydrocarbon conversions including, among others, alumina, quartz, barium sulfate or barytes, bauxite, clay, zircon or the like. Additional fines which can be added are the fines of the suitable cracking catalysts such as aluminosilicate-inorganic oxide gel catalysts, prepared by the process of this invention including silica-alumina, silica-zirconia, silica-alumina-zirconia, and the like. It is a requirement, however, that the finely divided material added to the hydrosol does not contain any materials which may poison the hydrocarbon conversion process. For example, the presence of various metals such as nickel, vanadium, iron, sodium, and the like are known to adversely affect the cracking operation of hydrocarbon oils. These fines which contain poisons must be avoided. It is a further requirement that the finely divided material that is added to the aluminosilicate-inorganic oxide sol have a weight mean particle diameter of less than 10 microns, preferably between 2 and 7 microns and more preferably between 3 and 5 microns. The use of material having a weight mean particle diameter in excess of 10 microns gives rise to a physically weak product while the use of fines having a weight mean particle diameter of less than 1 micron will produce a product of low diffusivity. The amounts of fines which can be added to the catalyst composite to improve the physical properties can range from about 15 to about 50 weight percent based on the finished catalyst composite. Above and below the range designated, the improvements are not significantly demonstrated.

After the aluminosilicate-inorganic oxide slurry is formed, gelation of the resulting sol is effected by the addition thereto of an acidic solution which can contain one or more metal salts as described above, the oxides of such metals being cogelled with silica. The acidic solutions used in gelation can include sulfuric acid, hydrochloric acid, nitric acid, acetic acid and the like in which is mixed one or more metal salts such as aluminum sulfate, aluminum chloride, aluminum nitrate, zirconium sulfate, titanium tetrachloride, magnesium sulfate, chromium sulfate, and the like.

The shapes of the formed gel are dependent upon the rate at which the globules of colloidal solution travel through the water-immiscible liquid; while the rate of movement of the globules depends upon the relative density and viscosity of the fluid medium employed. If the latter medium has a low viscosity and a density far removed from that of the colloidal solution, the globules of the latter solution will travel rapidly, hence, the gel pellets will assume flat or disc-like shapes. Examples of liquids in which pellets of this type may be produced are benzene, carbon tetrachloride, or petroleum naphtha. A water-immiscible fluid medium having a high viscosity such as lubricating oils, or a density close to that of the colloidal solution will effect slow movement of the globules of the latter solution and thus form spherically-shaped gel pellets. It is apparent from the above description that gel pellets of any shape, varying from flat-like discs to perfect spheres, may be manufactured by choice of a water-immiscible fluid medium having the proper density and viscosity.

After the gel composite has been prepared, the water-immiscible fluid film adheres to the composite and must be removed. The use of organic solvents would remove the film but the solvents would be adsorbed by the aluminosilicate present in the composite. It is at this point that an aqueous inorganic ammonium containing solution such as ammonium sulfate, ammonium nitrate, and the like is contacted with the gel composite at a rate to provide a turbulent flow of said solution for a period of time to remove the water-immiscible fluid traces from said gel. The film removal is required to improve the efficiency of the base-exchange step which follows to reduce more efficienty the sodium content of the gel composite. The flow of the aqueous inorganic ammonium-containing solution required can be determined utilizing the following formula designating the modified Reynolds number for the flow of fluids through a packed bed of solids as described by Chilton and Colburn (Perry, J. (ed.), Chemical Engineers' Handbook, McGraw-Hill Book Co., Inc., New York, 1950, p. 393).

$$Nre = \frac{DpVo\rho}{\mu}$$

where:

$Nre$ = Reynolds number, dimensionless
$Dp$ = average particle diameter
$Vo$ = superficial velocity based on empty vessel cross section
$\rho$ = fluid density
$\mu$ = absolute viscosity (all in consistent units).

When the Reynolds number is expressed in the above form, the flow is generally considered to be turbulent if the Reynolds number is greater than 40 although the transition fom laminar to turbulent flow is not clearly defined as it is the case of flow through conduits. It is essential in the process as described herein, that the flow of the aqueous inorganic ammonium-containing solution be turbulent. If the flow is not turbulent, the improvements utilizing this process will not be obtained. It is desired that the minimum Reynolds number of 300 be used in this process to asure turbulence and it is preferred that a level of Reynolds number of greater than 800 be utilized to decrease the amount of time necessary to remove the water-immiscible fluid film from the gel. The amount of inorganic ammonium salt present in the aqueous treating solution is not necessarily critical, however, it is preferred that the amount of ammonium salt range from about 0.7 to about 50 weight percent, preferably from 1 to about 10 weight percent of the aqueous solution. In addition to the use of turbulent flow of the aqueous inorganic ammonium-containing solution for removal of the water-immiscible fluid medium film, a small amount of a surface active agent such as the detergents described as a polyoxyethylene alkyl aryl ether, sorbitan monostearate, polyoxyethylene sorbitan monooleate and the like can be added to the aqueous ammonium-containing solution to aid in the removal of the undesired film. The amounts of surface active agents which can be used in the aqueous ammonium-containing solution can range from about 30 to about 1000 parts per million, preferably in the range from about 75 to 300 parts per million.

After the treatment of the gel composite with the aqueous inorganic ammonium-containing solution, the gel composites are base exchanged with an aqueous solution essentially characterized by a pH in excess of about 4.5, preferably by a pH in the range of 5 to 10 and containing an ion capable of replacing alkali metal. The base-exchange step is necessary to remove the substantial amount of sodium or other alkali metals provided by the alkali metal silicate used to prepare the gel. The contact of the base-exchange solution with the gel composite is conducted at a rate well below the turbulent rate used to remove the water-immiscible fluid film on the gel.

It is contemplated that any ionizable compound of a metal capable of replacing the alkali metal in the catalyst composite can be employed for base exchanging either alone or in combination with other ions. If the aluminosilicate portion of the catalyst composite has been previously base exchanged to substantially remove the alkali content prior to the combination of the aluminosilicate with the inorganic oxide sol, the use of a suitable ammonium salt solution alone such as ammonium chloride, ammonium sulfate, and the like may be desirable. If additional metals are wished to be added to the composite such as rare earth metals, calcium, magnesium, and the like, these metal cations can be used as the base-exchange medium, added to the ammonium solutions or used in conjunction with the ammonium solutions, i.e. initially base exchanged with the ammonium and followed by the desired metal cation solution to complete the base exchange. If the alkali metal aluminosilicate is utilized to prepare the gel, the base-exchange step is conducted with metals in the cationic state such as the soluble compounds including calcium, magnesium, manganese, vanadium, chromium, cerium, aluminum, lanthanum, praseodymium, nedoymium, samarium, yttrium, and other rare earths and mixtures of the same with other ions, such as ammonium. In any event, the base-exchange step is conducted to remove substantially all of the alkali metal in the gel composite. It is preferred to remove the sodium content of the gel composite until an amount of sodium of the composite, on a dry basis is at least below about 3 weight percent, preferably below about 1 weight percent and more preferably below about 0.5 weight percent.

The concentration of compound employed in the base-exchange solution may vary depending on the nature of the particular compound used, on the metal aluminosilicate undergoing treatment and on the conditions under which treatment is effected. The overall concentration of the replacing ion, however, is such as to substantially reduce the alkali metal content of the alkali-containing metal aluminosilicate composite. Generally, the concentration of compound, the cation of which replaces alkali metal from the metal aluminosilicate composite, is within the range of 0.2 to 30 percent by weight, although as noted hereinbelow other solution concentrations may be employed.

The temperature at which base exchange is effected may vary widely, generally ranging from room temperature to an elevated temperature below the boiling point of the treating solution. While the volume of base-exchange solution employed may vary widely, generally an excess is employed and such excess is removed from contact with the crystalline aluminosilicate after a suitable period of contact. The time of contact between the base-exchange solution and crystalline aluminosilicate in any instance in successive contacts is such as to effect replacement of the alkali metal ions thereof to an extent such that the alkali metal content of the composite after undergoing base exchange is less than 3 percent by weight. It will be appreciated that such period of contact may vary widely depending on the temperature of the solution, the nature of the alkali metal aluminosilicate used, and the particular compound employed for base exchange. Thus, the time of contact may extend from a brief period of the order of a few hours for small particles to longer periods of the order of days for large pellets.

After base-exchange treatment, the product is removed from the treating solution. Anions introduced as a result of treating with the base-exchange solution are removed by water-washing the treated composite for such period of time until the same is free of said anions. The washed product is then dried, generally in superheated steam, to remove substantially all the water therefrom. While drying may be effected at ambient temperature, it is more satisfactory to facilitate the removal of moisture by maintaining the product at a temperature between about 150 and about 600° F. for 4 to 48 hours.

The dried material is then subjected to an activating treatment essential to render the composition catalytically active. Such treatment entails heating the dried material in an atmosphere which does not adversely affect the catalyst.

It has been found that the catalyst selectivity of the above-described composition is greatly improved by subjecting the same to a mild steam treatment. Exposure of the catalyst to steam is, as will appear from data set forth hereinafter, a highly desirable step in obtaining a product capable of affording an enhanced yield of gasoline. Steam treatment may be carried out at a temperature within the approximate range of 800° F. to 1500° F. for at least about 2 hours. Usually, steam at a temperature of about 1000° F. to 1300° F. will be used with the treating period extending from about 2 to about 100 hours. Temperatures above 1500° F. may be detrimental and should generally be avoided. Also, an atmosphere consisting of a substantial amount of steam, say at least about 10 percent by volume, but containing air or other gas substantially inert with respect to the composite being treated may be used and such mixtures may, in some instances, be desirable with the use of the more elevated temperatures to avoid possible deactivation of the catalyst. The above-noted steam treatment serves to convert a substantial portion of the crystallinity of the original aluminosilicate to non-crystalline or amorphous material. It is thus a particular embodiment of the invention that at least about 25 percent and, preferably, at least 50 percent of the original crystallinity possessed by the aluminosilicate structure be converted to amorphous material to achieve a resulting catalyst product of optimum cracking characteristics. The finished catalyst product has a surface area, within the approximate range of 100 to 700 square meters per gram.

Cracking, utilizing the catalyst described herein, may be carried out at catalytic cracking conditions employing a temperature within the approximate range of 700° F. to 1200° F. and under a pressure ranging from subatmospheric pressure up to several hundred atmospheres. The contact time of the oil within the catalyst is adjusted in any case according to the conditions, the particular oil fed and the particular results desired to give a substantial amount of cracking to lower boiling products. Cracking may be effected in the presence of the instant catalyst utilizing well-known techniques including, for example, those wherein the catalyst is employed as a fixed bed or as a compact particle-form moving bed.

The cracking activity of the catalyst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5–7.5 volumes of liquid oil per volume of catalyst per hour for ten minute runs between regenerations.

Steam stability of the catalyst prepared in accordance with the method described herein was determined by an accelerated test which simulates the conditions encountered during catalyst use. In this test, the catalyst is contacted with 100 percent steam at 1200° F. and 15 p.s.i.g. for 24 hours and the cracking activity is then determined and compared with the cracking activity of fresh, unsteamed catalyst. The results thus obtained are indicative of the stability of the catalyst.

The attrition characteristics of the gels prepared in accordance with the method described herein were determined by an attrition test known as the Lauson Shaker Attrition (LSA) test. The procedure used in the test consists of shaking a 50 cc. sample of the product to be tested in a closed steel cup which is bolted to the piston of a motor-driven Lauson engine which operates at 1000 r.p.m. After shaking for a time sufficient to produce a 10 weight percent fines capable of passing through an 8-mesh (Tyler) screen, the sample is screened, weighed, and the percent loss is calculated. These operations are repeated until slightly more than half the sample has been reduced to fines. Cumulative losses are plotted against total shaking time for each cycle. The cumulative time in seconds for 50 percent weight of fines is read from the curve and is reported as the Lauson Shaker Attrition. Since the Lauson Shaker Attrition of gels is affected by the size of the particles tested, the attrition data reported herein is corrected to correspond to an average particle diameter of 0.140 inch to avoid the inference of this variable in correlating the effect of quantity and size of added powdered material on attrition. The satisfactory attrition characteristics of the catalysts prepared with the method described herein should exceed an LSA determination of 1000, preferably greater than 1500. A catalyst having an LSA determination below 1000 is not considered to have satisfactory attrition resistance.

The following comparative examples serve to illustrate the advantages of the process of the present invention without limiting the same:

EXAMPLE 1

An ion exchange operation was carried out to produce crystalline rare earth aluminosilicate from a powdered crystalline sodium aluminosilicate having uniform pore openings between 6 and 15 Angstrom units. The sodium aluminosilicate was prepared according to the procedure of U.S. 2,882,244.

Three tanks were connected in series and the charge to each of the three contacting vessels was as follows:

| | |
|---|---|
| Rare earth chloride (RECl$_3$·6H$_2$O)[1] ___pounds__ | 7.7 |
| Water _____do__ | 66.1 |
| Sodium aluminosilicate (47.3 weight percent water) _____do__ | 54.4 |
| A salt of lignin sulfonic containing: 3.8 weight percent CaO, 4.9 weight percent Na$_2$O, 1 weight percent MgO _____grams__ | [2] 26.5 |

[1] Typical analysis of rare earth chloride:

| | Percent wt. |
|---|---|
| CeCl$_3$·6H$_2$O | 43.5 |
| LaCl$_3$·6H$_2$O | 23.0 |
| NdCl$_3$·6H$_2$O | 17.9 |
| PrCl$_3$·6H$_2$O | 5.4 |
| SmCl$_3$·6H$_2$O | 1.9 |
| GdCl$_3$·6H$_2$O | 0.6 |
| YCl$_3$·6H$_2$O and others | 0.2 |
| Impurities | 7.5 |

[2] 0.2% weight based on dry sodium aluminosilicate.

The charge was heated to 180° F. and held at 180° F. for 45 minutes. At the end of 45 minutes, the addition of RECl$_3$·6H$_2$O solution to the first contacting stage was started at 2052 cc./min. with the overflow from the first tank going to the second, and the overflow from the third contacting stage going to a rotary filter and the cake discharge from the filter being returned to the first contacting stage. The temperature was maintained at 180° F. during the continuous addition, the addition was continued for 4½ hours. The flow rate of the RECl$_3$·6H$_2$O solution was set to circulate the contents of the three contacting stages once every 45 minutes. The concentration of the RECl$_3$·6H$_2$O solution was 0.237 lb. RECl$_3$·6H$_2$O/gal.

These conditions were selected to give 0.264 pound of RECl$_3$·6H$_2$O per pound of dry sodium aluminosilicate in the first 45-minute period of exchange and 0.066 pound of RECl$_3$·6H$_2$O per pound of dry sodium aluminosilicate in each of the six 45-minute subsequent periods of exchange. Over the complete exchange cycle 0.66 pound of RECl$_3$·6H$_2$O/pound of dry sodium aluminosilicate was used.

A batch-type pilot unit ball mill was used to grind a slurry of 36 weight percent rare earth aluminosilicate, as prepared above containing 0.4 weight percent, based on the solids, of a dispersant composed of a salt of lignin sulfonic acid containing 11 weight percent Na$_2$O, 0.4 weight percent CaO, and 0.5 weight percent MgO. The ball mill which rotated at 42 revolutions per minute was approximately 16 inches inside diameter and 16 inches long (1.86 cubic feet volume). The apparent volume of the grinding medium (½ inch to ⅝ inch flint pebbles) was 40 percent of the mill volume and the volume occupied by the grinding medium plus the slurry was 50 percent of the mill volume. After grinding in this manner for 2 hours, the particle size characteristics were determined as follows:

Particle size data: weight mean particle diameter,
| | |
|---|---|
| microns | 4.1 |
| Surface mean particle diameter, microns | 2.7 |
| Percent >10 microns | 2 |
| Percent <2 microns | 14 |

EXAMPLES 2-5

In the following examples, rare earth aluminosilicate-silica alumina oxide catalysts containing silica-alumina oxide fines were prepared. These catalysts were prepared utilizing specific proportions of starting materials and conditions as designated in Table I in the following general procedure.

An acid solution containing aluminum sulfate, sulfuric acid and water; a silicate solution containing sodium silicate, water and sodium hydroxide; and a fines slurry containing rare earth aluminosilicate of Example 1, having a weight mean particle diameter of about 4 microns and silica-alumina fines which have a weight mean particle diameter of about 3-5 microns and are composed of approximately 90% silica, 9.85% alumina and 0.15% chromia, were continuously mixed together through a mixing nozzle using the designated relative solution rates of addition. The resulting sol was formed in gel beads by ejection from the nozzle into a light lubricating oil boiling above 700° F. and having a kinematic viscosity from about 50 to about 150 centistokes at temperatures in the range from about 48° F. to 75° F. at a gelation time of from 3 to 6 seconds at a pH in the range from about 7.8 to 8.1. In the preparation of the catalysts, the silica-alumina fines in the silicate solution were maintained for a period of time not exceeding 90 minutes.

The gel composites obtained in Examples 4 and 5 were further treated with an aqueous ammonium sulfate solution by passing the solution over the gel at a rate to provide turbulent flow for a period of time to remove the oil film deposited on the gel. Example 4 demonstrates the use of the aqueous ammonium sulfate solution without the addition of a detergent while Example 5 uses the same process as Example 4 with the addition of 100 parts per million of a detergent composed of polyoxyethylene alkyl aryl ether. The catalysts of Examples 2 and 3 were not subjected to the aqueous ammonium sulfate solution treatment.

The resulting beads were then base exchanged at room temperature with an aqueous solution containing 1.4 to about 40 weight percent ammonium sulfate for a period of time to reduce the alkali content of the catalyst composite and then washed with water until the effluent water was free of sulfate and chloride ions. The washed gel beads were then steam dried at 260–340° F. for approximately 3–5 hours, and steam treated for 24 hours at 1200° F. using 100 percent steam at 15 pounds per square inch gauge pressure. The details of the catalyst preparation and catalyst composition are set forth in Table I below:

TABLE I

| Example | 2 | 3 | 4 | 5 |
|---|---|---|---|---|
| Acid Alum Solution: | | | | |
| Water* | 90.91 | 90.91 | 90.91 | 90.91 |
| Aluminum sulfate* | 5.80 | 5.80 | 5.80 | 5.80 |
| Sulfuric acid* | 3.29 | 3.29 | 3.29 | 3.29 |
| Specific Gravity at 60° F | 1.083 | 1.083 | 1.083 | 1.083 |
| Solution rate, cc./min. | 397 | 385 | 384 | 393 |
| Sodium Silicate Solution: | | | | |
| Sodium silicate (Na$_2$O/SiO$_2$=0.31/1)* | 60.11 | 60.11 | 60.11 | 60.11 |
| Water* | 37.17 | 37.17 | 37.17 | 37.17 |
| Sodium hydroxide* | 2.72 | 2.72 | 2.72 | 2.72 |
| Specific gravity at 60° F | 1.251 | 1.251 | 1.251 | 1.251 |
| Solution rate, cc./min. | 291 | 291 | 291 | 291 |
| Fines Slurry: | | | | |
| Water* | 85.20 | 84.84 | 84.80 | 84.80 |
| Rare earth aluminosilicate fines* | 3.20 | 3.24 | 3.23 | 3.23 |
| Silica-alumina fines* | 11.60 | 11.92 | 11.97 | 11.97 |
| Specific gravity at 60° F | 1.012 | 1.106 | 1.106 | 1.106 |
| Solution rate, cc./min. | 128 | 128 | 127 | 128 |

See footnotes at end of table.

TABLE I—Continued

| Example | 2 | 3 | 4 | 5 |
|---|---|---|---|---|
| Gelation time, sec | 6.0 | 5.6 | 5.7 | 5.3 |
| Gelation temperature, °F | 51 | 59 | 57 | 60 |
| Aqueous Ammonium Sulfate Treatment (Turbulent Flow): | | | | |
| Ammonium sulfate, percent weight | None | None | 1.4 | 1.4 |
| Polyoxyethylene alkyl aryl ether parts per million | None | None | None | 100 |
| Aqueous Ammonium Sulfate Base Exchange: | | | | |
| Ammonium sulfate, percent weight | 7.5 | 32 | 32 | 32 |
| Rate cc./min | 9.5 | 3.4 | 3.4 | 3.4 |
| Minutes | 154 | 90 | 90 | 90 |
| Water Washing: | | | | |
| Rate cc./min | 27 | 66 | 66 | 66 |
| Minutes | 300 | 120 | 120 | 120 |
| Composition of Finished Catalyst: | | | | |
| Aluminum oxide* | 8.0 | 7.9 | 7.9 | 8.0 |
| Silica* | 68.6 | 68.2 | 68.4 | 68.4 |
| Rare earth aluminosilicate* | 5.0 | 5.0 | 5.0 | 5.0 |
| Silica-alumina fines* | 17.9 | 18.4 | 18.4 | 18.4 |
| Sodium* | 0.62 | 0.57 | 0.30 | 0.14 |
| Physical Properties: | | | | |
| Packed Density, grams/cc | 0.72 | 0.79 | 0.77 | 0.74 |
| LSA 50% corrected to 0.140 inch particle diameter | 2,550 | 1,900 | 2,950 | 2,150 |

*Weight Percent.

Evaluation of the catalysts produced above for the cracking characteristics for a Mid-Continent gas oil are described in Table II below. The Mid-Continent gas oil used had the following properties:

*Typical properties of wide cut Mid-Continent gas oil*

Specific gravity, °API _____ 29.5
Sulfur, percent wt. _____ 0.47
Nitrogen, percent wt. _____ 0.07
Aniline point (°F.) _____ 181.5
Carbon residue (Conradson) _____ 0.24

Vacuum assay: °F.
I.B.P. _____ 363
5% _____ 542
10% _____ 571
20% _____ 598
30% _____ 624
40% _____ 660
50% _____ 702
60% _____ 750
70% _____ 801
80% _____ 858
90% _____ 928
95% _____ 969

TABLE II

| Example | 2 | 3 | 4 | 5 |
|---|---|---|---|---|
| Cracking Properties: | | | | |
| Temperature, °F | 875 | 875 | 875 | 875 |
| LHSV | 3 | 3 | 3 | 3 |
| Catalyst to Oil Ratio | 2 | 2 | 2 | 2 |
| Conversion, Percent Volume | 43.7 | 44.2 | 48.4 | 53.3 |
| Gasoline, $C_5$+Percent Volume | 37.2 | 37.5 | 40.6 | 43.9 |
| Total $C_4$'s, Percent Volume | 9.2 | 9.3 | 10.5 | 12.0 |
| Dry Gas, Percent Weight | 3.7 | 3.8 | 4.2 | 4.7 |
| Coke, Percent Weight | 1.8 | 1.9 | 2.1 | 2.5 |

It should be noted that the catalysts of Examples 2 through 5 were prepared in a similar procedure and have similar compositions. The catalysts of Examples 4 and 5, however, were further treated by the ammonium sulfate treatment of this invention. The cracking results as demonstrated in Examples 4 and 5 are superior in cracking activity and overall yield of desirable products to those of the untreated catalysts of Examples 2 and 3.

It is to be understood that the foregoing description is merely illustrative of preferred embodiments of the invention of which many variations may be made by those skilled in the art within the scope of the following claims without departing from the spirit thereof.

What is claimed is:

1. In a process for manufacturing a particle-form gel composite by introducing a mixture comprising finely divided crystalline aluminosilicate and an inorganic oxide sol into a body of water-immiscible fluid in the form of globules, permitting said globules of sol to set to hydrogel in said water-immiscible fluid, removing the particles of hydrogel so formed from the said fluid, base exchanging to remove zeolitic metal therefrom and drying, the improvement which comprises passing over the hydrogel composite particles, after removal from said fluid but prior to base exchange, an aqueous inorganic ammonium-containing solution having therein about 30 to about 1000 parts per million of a surface-active agent at a rate to provide turbulent flow of said solution corresponding to a Reynolds number of at least 300 for a period of time to remove water-immiscible fluid from said hydrogel particles.

2. The process of claim 1 wherein said crystalline aluminosilicate is rare earth aluminosilicate.

3. The process of claim 1 wherein said sol is a siliceous sol.

4. The process of claim 1 wherein said crystalline aluminosilicate is rare earth aluminosilicate, said sol is a silica-alumina sol, said water-immiscible fluid is a lubricating oil boiling above about 700 F. and has a kinematic viscosity in the range from about 50 to 150 centistokes and said surface-active agent comprises about 75 to about 300 parts per million of a polyoxyethylene alkyl aryl ether.

5. In a process for manufacturing a particle-form gel composite by introducing a mixture comprising finely divided crystalline aluminosilicate and inorganic fines which are inert to catalytic hydrocarbon conversions and have a weight mean particle diameter from about 1 to about 10 microns and an inorganic oxide sol into a body of water-immiscible fluid in the form of globules, permitting said globules of sol to set to hydrogel in said water-immiscible fluid, removing the particles of hydrogel so formed from said fluid, base exchanging to remove zeolitic metal therefrom and drying, the improvement which comprises passing over the hydrogel composite particles, after removal from said fluid but prior to base exchange, an aqueous inorganic ammonium-containing solution at a rate to provide a turbulent flow of said solution corresponding to a Reynolds number of at least 300 for a period of time to remove water-immiscible fluid from said hydrogel particles.

6. In a process for manufacturing a particle-form gel composite by introducing a mixture comprising finely divided crystalline aluminosilicate and inorganic fines which are inert to catalytic hydrocarbon conversions and have a weight mean particle diameter from about 1 to about 10 microns and an inorganic oxide sol into a body of water-immiscible fluid in the form of globules, permitting said globules of sol to set to hydrogel in said water-immiscible fluid, removing the particles of hydrogel so formed from said fluid, base exchanging to remove zeolitic metal therefrom and drying, the improvement which comprises passing over the hydrogel composite particles, after removal from said fluid but prior to base exchange, an aqueous inorganic ammonium-containing solution having therein about 30 to about 1000 parts per million of a surface-active agent at a rate to provide turbulent flow of said solution corresponding to a Reynolds number of at least 300 for a period of time to remove water-immiscible fluid from said hydrogel particles.

7. In a process for manufacturing a particle-form gel composite by introducing a mixture comprising finely divided rare earth crystalline aluminosilicate and silica-alumina fines having a weight mean particle diameter from 1 to about 10 microns and a silica-alumina sol into a lubricating oil boiling above about 700 F. and having a kinematic viscosity in the range from about 50 to about 150 centistokes in the form of globules, permitting said globules of sol to set to hydrogel in said oil, removing the particles of hydrogel so formed from said oil, base exchanging to remove zeolitic metal therefrom and drying, the improvement which comprises passing over the hydrogel composite particles, after removal from said oil but prior to base exchange, an aqueous inorganic ammonium-containing solution having therein about 30 to about 1000 parts per million of a surface-active agent at a rate to provide turbulent flow of said solution corresponding to a Reynolds number of at least 800 for a period of time to remove lubricating oil from said hydrogel particles.

References Cited by the Examiner
UNITED STATES PATENTS

| | | | |
|---|---|---|---|
| 2,384,946 | 9/1945 | Marisic | 252—488 |
| 2,503,913 | 4/1950 | Kimberlin et al. | 252—448 X |
| 2,774,742 | 12/1956 | Stover et al. | 252—448 |

OSCAR R. VERTIZ, *Primary Examiner.*

MAURICE A. BRINDISI, *Examiner.*

R. D. EDMONDS, H. S. MILLER, A. J. GREIF,
*Assistant Examiners.*

UNITED STATES PATENT OFFICE
CERTIFICATE OF CORRECTION

Patent No. 3,301,794                        January 31, 1967

Robert H. Cramer et al.

It is hereby certified that error appears in the above numbered patent requiring correction and that the said Letters Patent should read as corrected below.

Column 8, line 56, for "inference" read -- interference --; columns 9 and 10, TABLE I, second column, line 14 thereof, for "1.012" read -- 1.102 --.

Signed and sealed this 17th day of October 1967.

(SEAL)
Attest:

Edward M. Fletcher, Jr.                        EDWARD J. BRENNER

Attesting Officer                               Commissioner of Patents